Feb. 20, 1968 E. KAY ETAL 3,369,989
CATHODE SPUTTERING APPARATUS INCLUDING PRECISION
TEMPERATURE CONTROL OF SUBSTRATE
Filed July 22, 1964 5 Sheets-Sheet 1

INVENTORS
ERIC KAY
ARTHUR P. POENISCH
BY
ATTORNEY

Feb. 20, 1968 E. KAY ETAL 3,369,989
CATHODE SPUTTERING APPARATUS INCLUDING PRECISION
TEMPERATURE CONTROL OF SUBSTRATE
Filed July 22, 1964 5 Sheets-Sheet 2

Feb. 20, 1968    E. KAY ETAL    3,369,989
CATHODE SPUTTERING APPARATUS INCLUDING PRECISION
TEMPERATURE CONTROL OF SUBSTRATE
Filed July 22, 1964    5 Sheets-Sheet 4

United States Patent Office 3,369,989
Patented Feb. 20, 1968

3,369,989
CATHODE SPUTTERING APPARATUS INCLUDING PRECISION TEMPERATURE CONTROL OF SUBSTRATE
Eric Kay, Campbell, and Arthur P. Poenisch, San Jose, Calif., assignors to International Business Machines Corporation, New York, N.Y., a corporation of New York
Filed July 22, 1964, Ser. No. 384,356
5 Claims. (Cl. 204—298)

The present invention relates to improved apparatus for temperature control in extreme environments and, more particularly, to temperature control apparatus for maintaining constant the temperature of a substrate during deposition of thin films by impact evaporation.

Interest in the field of deposition of thin films by impact evaporation, also known as "glow discharge sputtering," has existed for a considerable length of time. This interest has increased sharply in recent years, particularly in the electronic industry where developments have been pursued in magnetic, superconducting and semiconductor thin film surfaces. These thin films have been shown to provide substantial advances as memory elements, as switching elements, and even as complete electrical circuits.

In these modern applications, it has been found that alterations in the crystalline structure of a stratum of a thin film can completely alter the characteristics of that film. The ideal situation is to condense or "grow" a thin film having an identical predetermined crystalline structure throughout. However, prior sputtering apparatus has been plagued by a sputtering "start-up" problem wherein the first moments of deposition of a thin film have been accompanied by a sudden increase in the temperature of the substrate and of the thin film, which eventually assumes an equilibrium temperature for the remainder of the sputtering process. It is this initial radical temperature change which causes the first portion of the thin film to assume a crystalline structure different than that attained by the remainder of the film which is deposited at the equilibrium temperature. This problem is due to the sudden exposing of the substrate to high-energy particles, particularly electrons, which have not been thermalized in transit from the cathode to anode. As a result, unavoidable temperature gradients of from 300° C.–400° C. in the first 100 seconds of film growth have been the general rule (M. H. Francombe and A. J. Noreika, Symposium on Electrical and Magnetic Properties of Thin Metallic Layers, Louvain, Belgium, Sept. 4–7, 1961, page 199), which is th average total deposition time of a film of 1,000 angstroms.

It has been realized for quite some time that maintaining the substrate at a predetermined constant temperature independent of the discharge conditions would be an ideal result. However, the prior art has been unable to develop apparatus which would accomplish this result in the plasma (or discharge) environment.

Implementation of substrate temperature control is extremely difficult in the discharge environment due to the large heat exposure encountered and due to the precise characteristics required by modern thin films. Some of the specific problems are discussed below.

First, the temperature along the entire substrate surface must be accurately controlled without temperature profiles so that the entire area of the thin film has the same characteristics.

Second, if sputtering is occurring in the presence of magnetic fields, which may be necessary to enhance sputtering rates, as disclosed in our U.S. Patent No. 3,282,815, "Magnetic Control of Film Deposition," filed July 1, 1963, or if magnetic thin films are being synthesized, then the entire assembly must be nonmagnetic in order to prevent field distortions, and it must not generate unwanted magnetic fields.

Third, the apparatus must be capable of operation in a high vacuum at high temperatures from a strength and leak standpoint.

Fourth, if the substrates are mechanically fastened to the temperature control apparatus for adequate heat transfer, the surface of the substrate supporting unit must be maintained in exact planarity to prevent strains in the substrate. This is particularly important in fast switching memory magnetic film applications. Thus, exact planarity of the substrate support must be maintained in the presence of a high temperature environment and in the presence of a high pressure differential between the interior and exterior of the substrate support.

Fifth, the entire temperature control apparatus must be electrically and hermetically isolated from the glow discharge to avoid electrical shorts through the conducting plasma and to prevent contamination of the deposited thin film.

Sixth, electrical wiring must be maintained at a low temperature to protect the insulation and to protect any vacuum seals through which the wiring may be inserted.

Seventh, in the event a noninert gas is used as the ionizing agent, the entire assembly must be made of a material which will not react with the gas.

Therefore, it is an object of the present invention to provide glow discharge sputtering apparatus which will produce thin films having identical crystalline structure and identical characteristics throughout the deposition period.

It is a further object of the present invention to provide apparatus for producing deposition of a thin film on a substrate by impact evaporation, which maintains the substrate at a constant temperature through the period of such deposition.

A still further object of the present invention is to provide apparatus producing deposition of a thin film on a substrate wherein the entire substrate surface is maintained at an even temperature, i.e., without temperature profiles, throughout the period of such deposition.

Another object of the present invention is to provide glow discharge sputtering apparatus having an accurately temperature controlled anode wherein the entire anode and temperature control assembly is nonmagnetic and does not generate unwanted magnetic fields.

Still another object of the present invention is to provide a temperature control apparatus capable of operation in a high vacuum discharge environment, and which is capable of maintaining constant the temperature of a substrate during sudden heat exposure caused by high-energy particle bombardment.

Another object of the present invention is to provide apparatus for maintaining constant the temperature of a planar substrate during glow discharge sputtering wherein the surface of the apparatus supporting the planar substrate is maintained in exact planarity throughout the period of the sputtering.

Still another object of the present invention is to provide apparatus for maintaining constant the temperature of a substrate during glow discharge sputtering wherein the temperature control apparatus is hermetically and electrically isolated from the glow discharge to prevent contamination of the deposited thin film and to prevent electrical shorts through the conducting plasma.

A still further object of the present invention is to provide a temeprature control apparatus capable of operation in a high temperature discharge environment wherein all electrical wiring is maintained at a relatively low temperature.

An additional object of the present invention is to provide a temperature control apparatus for use in a glow discharge environment which will not react with a noninert ionizable gas.

A feature of the present invention is that it may be used for controlling the temperature of a substrate in applications other than the glow discharge sputtering application where the invention spells the critical difference between success and failure in the development of thin films having uniform characteristics.

The foregoing and other objects, features and advantages of the invention will become apparent in the following more particular description of a preferred embodiment of the invention, as illustrated in the accompanying drawings, wherein.

Figure 9:
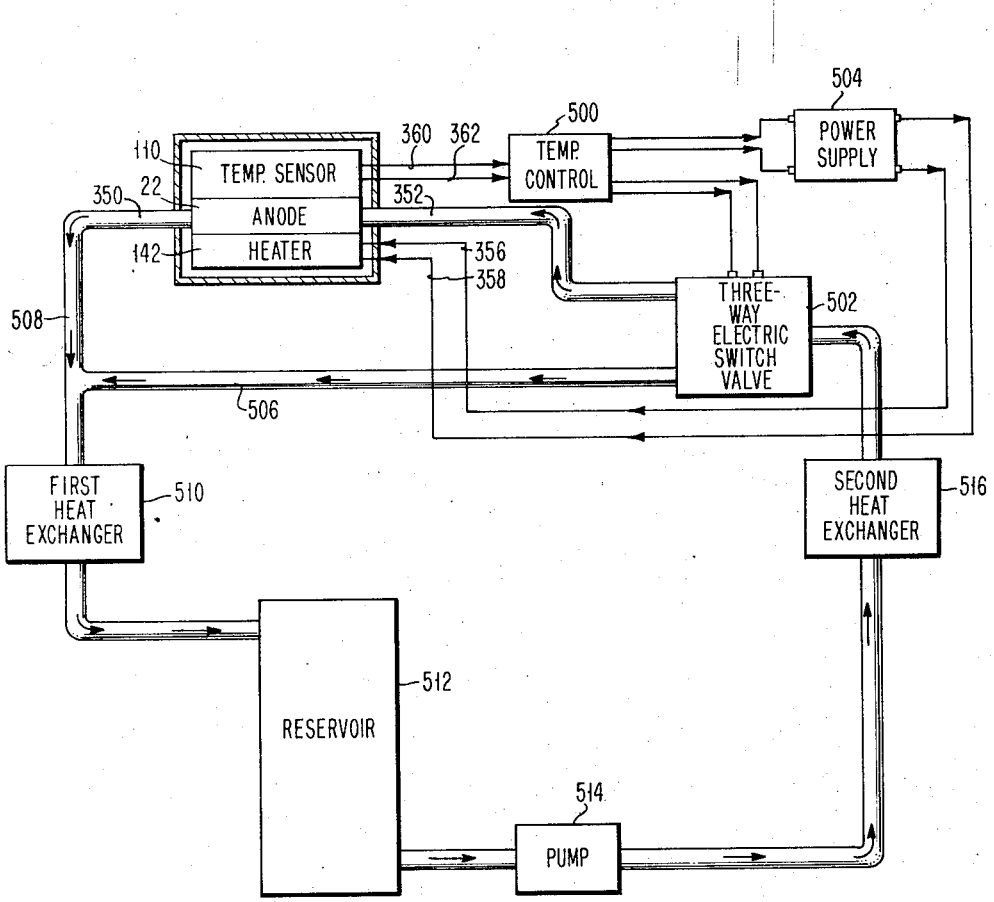

FIG. 9 schematically shows the electrically power supply, coolant supply units and control apparatus of the subject invention.

Figure 1:
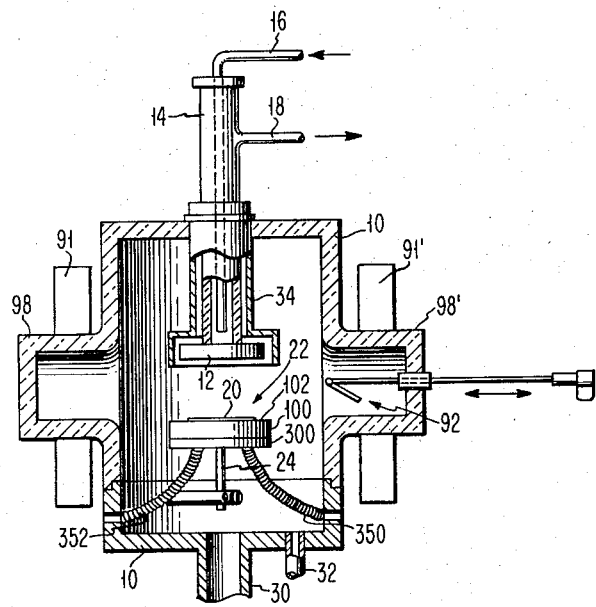
FIG. 1 shows the overall sputtering apparatus.

The sputtering environment wherein the invention is utilized is best understood by reference to FIG. 1, which shows an example of an overall glow discharge sputtering apparatus configuration. A cylindrical vessel 10 is provided which is capable of accommodating evacuation pressures in the range of $10^{-1}$ to $10^{-7}$ torr. The vessel 10 may generally be composed of any suitable material, such as glass, ceramic or metal. The example of sputtering apparatus shown in FIG. 1 may be used for sputtering magnetic thin films, and, therefore, the vessel 10 comprises a glass envelope wherein the walls are at least two inches from the perimeter of the cathode 12. In magnetic thin film sputtering, the smallest diameter envelope compatible with the two-inch requirement is used since a uniform magnetic field in the plane of the film is to be produced by Helmholtz coils 91, 91' mounted externally to the envelope. The extension 98, 98' to vessel 10 allows a collapsible shield 92 to be conveniently withdrawn into a cavity formed thereby and still allows the Helmholtz coils to be brought close to the electrode assembly. This closeness is vital as the field degenerates with the square of the distance from the discharge area.

The cathode 12 of the two-electrode glow discharge apparatus is planar and is made of the material to be impact evaporated. As an alternative, the cathode may be merely overlaid with a sheet of the material to be impact evaporated. The cathode may be cooled to a desired extent by means of a cooling unit 14 in jacket form at the base of the cathode 12. Any suitable coolant, such as water, may be pumped in at inlet 16, emerging at outlet 18 to be cooled and recirculated.

A substrate 20, upon which the thin film is to be deposited, is affixed upon the face of anode 22. The anode, which will be described in detail hereinafter, is mounted on support 24. A desired anode-cathode potential drop can be established by means of any suitable low-impedance, filtered, D.C. power supply.

Desired glow discharge effects usually occur in the pressure range of $10^{-1}$ to $10^{-4}$ torr. A diffusion pump (not shown) is used to pump down to glow discharge pressures through outlet 30 and thereafter to maintain the vacuum constant while clean, ionizable gas is being fed at port 32. Because ion current density is very sensitive to small pressure fluctuations, the flow rate of inert gas through the system must be closely regulated by balancing the gas input through port 32 with the output through outlet 30 to the pump. This is done by balancing the gas input through a variable leak, for instance a double-needle valve against the pumping speed of the diffusion pump connected to outlet 18.

The glow discharge zones are contained by the use of both the quadrupole magnetic field and of shielding means 34. When placed around planar cathode 12, shield 34 prevents discharge except normally from the cathode face toward anode 22.

The specific details of construction and operation of the sputtering apparatus illustrated are explained in our U.S. Patent No. 3,282,815, above, and in copending U.S. application Ser. No. 290,794, now U.S. Patent No. 3,278,407, entitled "Deposition of Thin Film by Impact Evaporation," and U.S. Patent No. 3,282,816, entitled, "Symmetrical Sputtering Apparatus," both by Eric Kay and assigned in common with this case.

Figure 2:
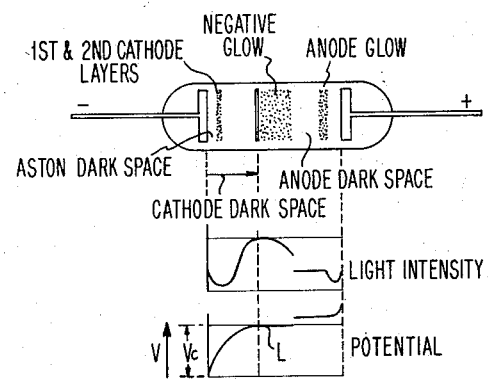
FIG. 2 shows the characteristic glow discharge regions and discharge parameters along the length of the discharge.

As discussed in U.S. Patent No. 3,278,407, above, FIG. 2 schematically shows the variation of glow discharge characteristics along the length of the cathode-anode discharge for a typical glow discharge. This diagram and the following description may serve to clarify some of the terms used in the instant case. The anode-cathode voltage potential accelerates free electrons toward the anode and attracts positive ions toward the cathode. The glow discharge is maintained by electrons produced at the cathode as a result of positive ion bombardment, which electrons, in turn, will be driven toward the anode, thereby producing more positive ions to bombard the cathode, eroding particles therefrom which will then diffuse toward the substrate and deposit thereon. In the Aston dark space, there is an accumulation of these electrons which gain energy through the Crookes dark space, also called "cathode fall" or "cathode dark space." The decay of excitation energy of the positive ions on neutralization at the cathode gives rise to the cathode glow. Electrons which have passed through the Crookes dark space enter a constant-field space, some of them with fairly high velocities. Here, they gradually lose their energy in inelastic collisions with atoms of the gas. Some collisions cause ionization, and others merely excite the atoms without ionizing them, causing the "negative glow" upon the decay of such excitation energy.

Figure 3:
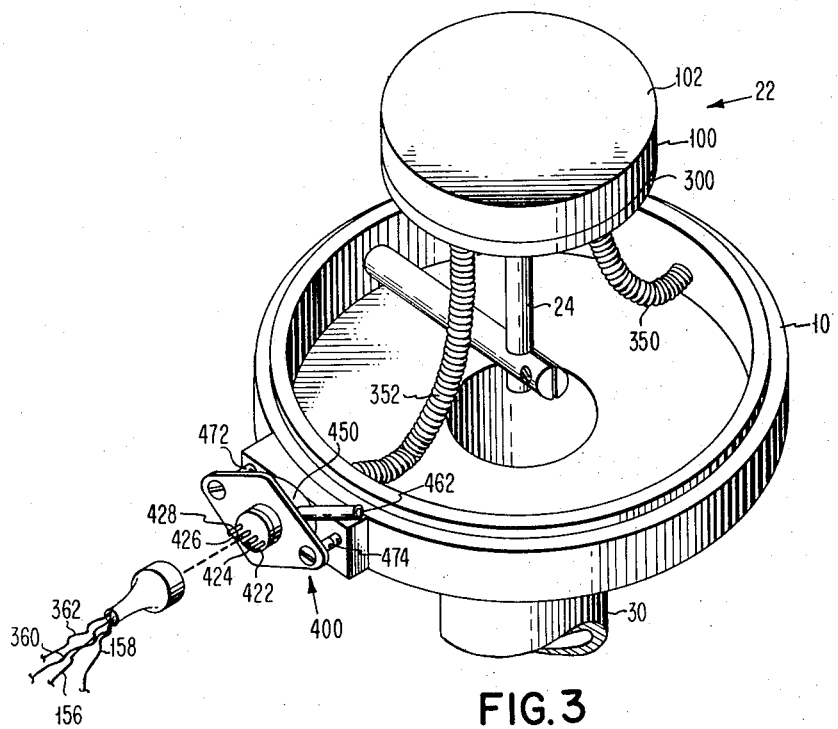
FIG. 3 is an oblique view of the temperature-controlled anode of the subject invention.
Figure 4:
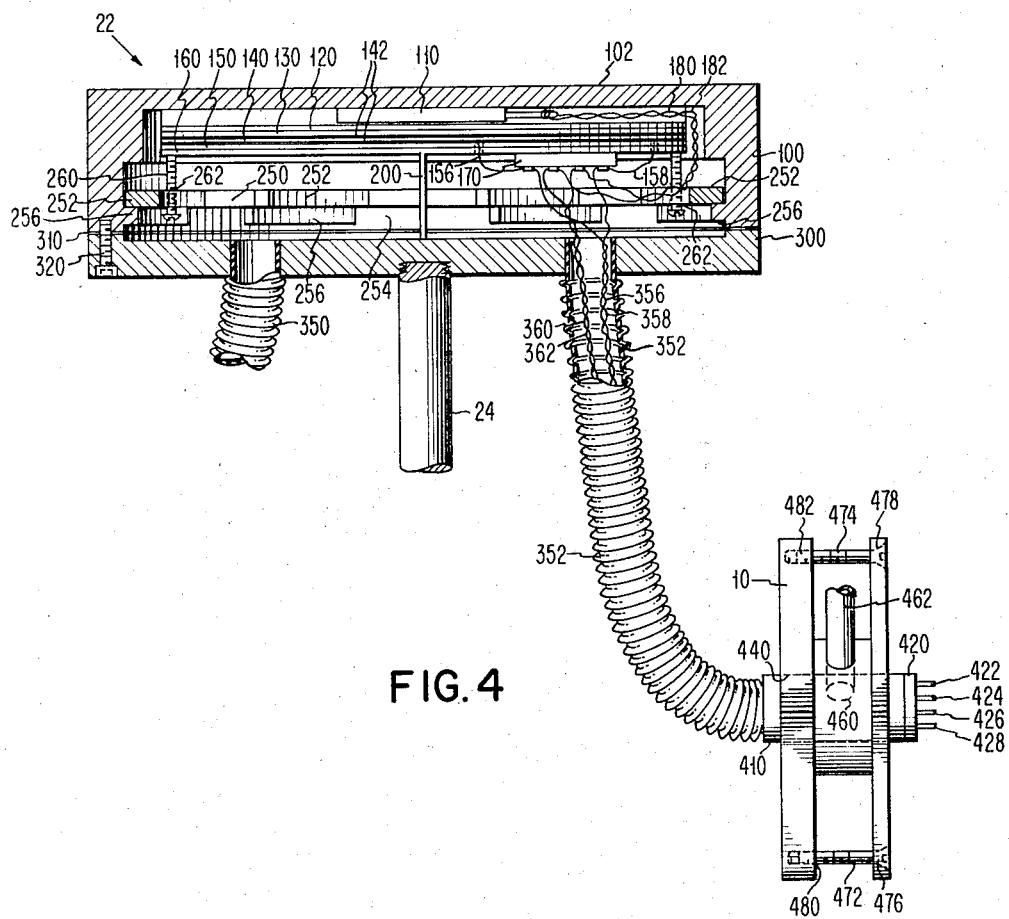
FIG. 4 is a cross-sectional view of the temperature-controlled anode of FIG. 3.
Figure 5:
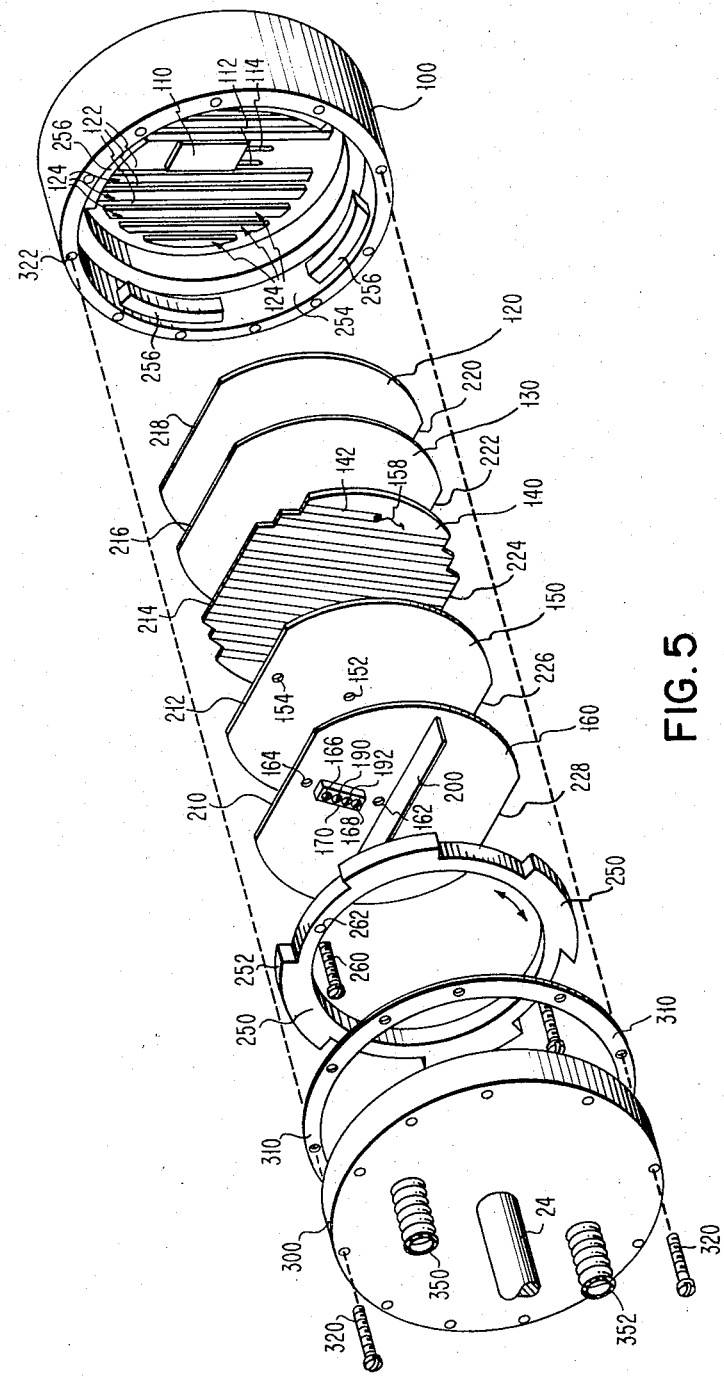
FIG. 5 is an exploded view of the temperature-controlled anode of FIG. 3.

Anode 22 of FIG. 1 is shown in greater detail in FIGS. 3, 4 and 5. Referring to those figures, an anode cap 100 is made from any suitable, sufficiently strong, heat-conductive, nonmagnetic material. We have found copper to be suitable for equilibrium sputtering temperatures up to 400° C.; at higher temperatures, Monel 403 or 404 is desirable. The top surface 102 of the cap is planar so as to provide a good thermal connection with the entire area of substrate 20 supported thereon. The illustrated structure and use of described materials result in maintaining the planarity of the cap under high temperature and high pressure differentials. The substrate 20 may be merely placed on the surface of the cap 100, or it may be mechanically connected thereto by means of screws or other mechanical connectors.

Figure 6:
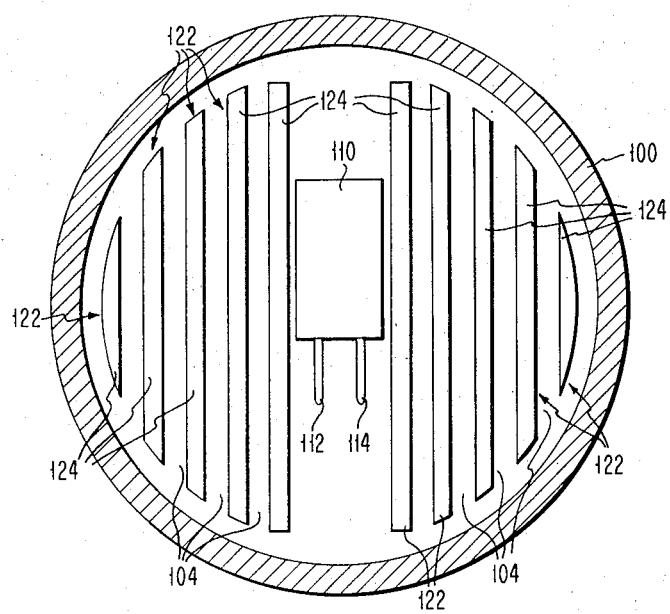
FIG. 6 is a bottom view of the coolant channels of the anode cap 100 of FIG. 4.

Referring additionally to FIG. 6, a series of channels 104 are cut in the bottom surface of the cap 100 so as to provide a thorough flow of coolant, as will be explained hereinafter. Temperature sensing device 110 is attached in thermally conductive relationship to the lower surface of cap 100 so as to detect the temperature of the cap. The temperature sensing element may be of the platinum-resistance type which varies the electrical resistance between terminals 112 and 114 in accordance with the temperature of the anode cap. A planar, heat-conductive sheet 120, which may be copper, is placed against the top surfaces 124 of the portions of the cap 122 which form dividers between the coolant channels 104. Sheet 120 thus forms a cover so as to enclose the coolant channels. Since the sheet is heat-conductive, it assists in maintaining the entire cap surface at the same temperature.

Figure 7:
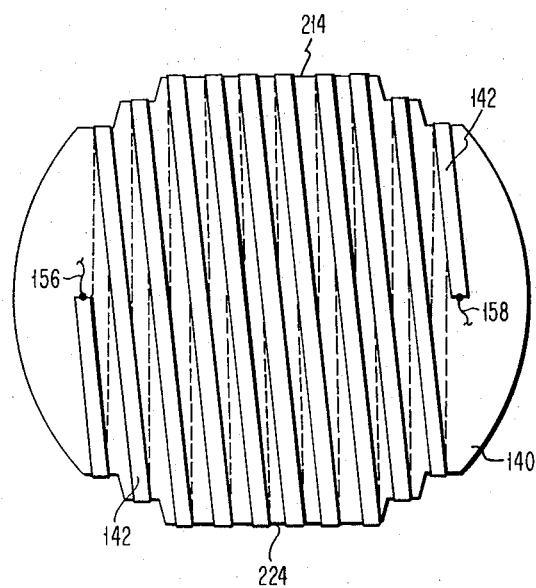
FIG. 7 is a top view of the heating electrode of the temperature-controlled anode of FIG. 4.

A sheet 130 of electrically insulating material, such as mica, is placed adjacent copper sheet 120. A form 140 of electrically insulating material is provided having a series of notchs cut into its periphery. A heating ribbon 142 of suitable material, such as platinum, is wound around the form in such a manner that one strand lies within each notch, as may be seen by reference to FIG. 7. Such a way of winding results in producing a negligible magnetic field.

Another mica insulating sheet 150 is placed adjacent heating elements 140, 142 on the side opposite sheet 130. Two holes, 152 and 154, are provided for lead-in wires 156 and 158 to platinum heater ribbon 142.

A backing plate 160 is made of any suitable material, such as stainless steel, and is placed adjacent mica sheet 150. Heater lead-in wires 156 and 158 are threaded through holes 162 and 164 of the backing plate and are connected to terminals 166 and 168 on terminal block 170 mounted on the backing plate. Temperature sensing lead-in wires 180 and 182 are connected at one end to terminals 112 and 114 of temperature sensing unit 110, and the other end to terminals 190 and 192 on terminal block 170.

Coolant baffle 200 is also mounted on backing plate 160. The baffle blocks the flow of coolant and forces the coolant to flow into the channel formed between the inner wall of cap 100 and the flat sides 202, 204, 206, 208 and 210 of the various disks. The coolant then progresses through the channels 104 in the anode cap and out through the channel formed between the wall of the anode cap and flat sides 220, 222, 224, 226 and 228 of the disks.

A retaining ring 250 is provided and has protruding ears 252 which slip through gaps 254 in anode cap 100. The retaining ring is then rotated a small amount so that the ears rest against the top of corresponding ears 256 on anode cap 100. A plurality of screws 260 are threaded through holes 262 to press against backing plate 160 so as to compress the sandwich of plates 120, 130, 140 and 150 and form a compact unit within anode cap 100.

The resulting anode unit is then mounted on stainless steel back cover 300, which is attached to support 24. Sealing gasket 310 is placed between the anode cap and the back cover, and screws 320 are inserted through holes in the back cover and the gasket and are threaded into holes 322 in anode cap 100 to thereby seal the interior of the anode, which is at about atmospheric pressure, from the sputtering atmosphere, which is a near-vacuum.

Figure 8:
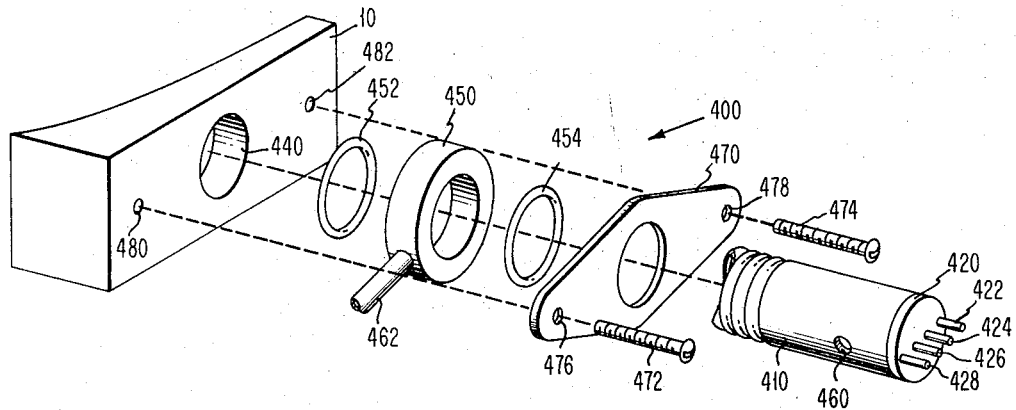
FIG. 8 is an exploded view of the coolant and electrical connector of FIG. 4.

Corrugated metal tubing 350 and 352 connects the interior of anode 22 to the coolant supply system. Referring to FIGS. 4 and 8, tubing 352 is connected to a coolant and electrical connector unit 400. Heater connecting wires 356 and 358 are connected to heater lead-in wires 156 and 158 at terminal block 170 and are inserted inside tube 352 and connected to connector 400. Temperature sensing lead-in wires 360 and 362 are connected at one end to terminals 190 and 192 of terminal block 170, and the other end is inserted in tube 352 and connected to connector 400.

Connecting unit 400 comprises a tube 410 having an end cap 420 with various electrical connecting pins 422, 424, 426 and 428 extending therethrough. Each of the wires 156, 158, 360 and 362 are connected to one of the electrical connecting pins. Tube 410 is inserted into hole 440 in the wall of sputtering container 10. Coolant inlet 450 and O-rings 452 and 454 are inserted over tube 410. The tube 410 and coolant inlet 450 are then adjusted so that hole 460 in tube 410 is accurately aligned with outlet connector 462. Clamp 470 is then placed over tube 410, and screws 472 and 474 are inserted through holes 476 and 478 in clamp 470 and threaded into holes 480 and 482 in the wall of container 10. Tightening the screws causes clamp 470 to compress O-rings 452 and 454 so as to form a pressure-tight seal, thereby preventing the escape of any coolant, and preventing air outside container 10 from entering the discharge sputtering environment.

Referring to FIG. 9, the temperature sensor 110, anode 22 and heater 142 of FIGS. 4 and 5 are schematically represented. For convenience of illustration, temperature sensor 110, heater 142 and the associated lead-in wires are not shown in their actual locations inside anode 22 and tube 352.

Temperature sensor 110 is connected by means of leads 360 and 362 to temperature control unit 500. Temperature control unit 500 is a well-known relay switching unit which responds to various resistance across leads 360 and 362 by switching "on" or "off" electric valve 502 or power supply 504. An example of such a switching unit is "Thermatrol." Electric valve 502 is a three-way valve and controls the flow of suitable coolant, such as nitrogen gas, through tube 352 to anode 22. When the valve 502 is switched "on,'" it directs the flow of coolant to anode 22, and when switched "off," directs the flow through by-pass 506. The circulating system for the coolant further includes output tube 350 through which coolant from anode 22 flows to junction 508, meeting by-pass 506, and then to first heat exchanger 510 for cooling and to reservoir 512 for storage. Electric pump 514 forces the coolant through second heat exchanger 516 to valve 502.

Upon the actuation of power supply 504 by temperature control unit 500, the power supply produces a potential between wires 156 and 158, causing a current flow through heater 142.

Temperature control unit 500 is continually switching at the rate of about once per second. The unit switches valve 502 "on" and power supply 504 "off," then it switches valve 502 "off" and power supply 504 "on." If the control unit is in the "heat" state for an amount of time equal to the "cool" state, an equilibrium will be maintained. To deliver a net amount of heat, the "heat" state takes a longer portion of the switching cycle. If heat is to be removed, the "cool" state takes a larger portion of the switching cycle.

To understand the operation of the subject invention, refer first to FIGS. 1, 3 and 4. Substrate 20 is placed on the surface 102 of anode 22, and container 10 is sealed. A vacuum pump (not shown) then evacuates container 10 though outlet 30 to a pressure in the range of $10^{-7}$ torr, and an ionizable gas, such as argon, is allowed to flow into the container by way of port 32. The diffusion pump thereafter maintains the vacuum constant at a pressure in the range of $10^{-1}$ to $10^{-4}$ torr, while clean, ionizable gas is being fed at port 32.

Referring also to FIG. 9, temperature control unit 500 is activated and immediately operates power supply 504 and electric valve 502 in a manner to bring anode 22 up to the desired temperature. Then, control unit 500 settles into an equilibrium state to maintain anode 22 at the desired temperature.

Shield 92 is then inserted into the area between anode 22 and cathode 12. Energizing potential is then applied to cathode 12, by way of jacket 14, to initiate sputtering between anode 22 and cathode 12, with shield 92 protecting substrate 20. Glow discharge is initiated with shield 92 in place in order to clean the cathode so that no impurities will be deposited on the substrate. When the desired sputtering conditions are reached, shield 92 is suddenly withdrawn. Sputtering then continues between cathode 12 and anode 22, resulting in the deposition of sputtering particles on substrate 20.

An alternative to the sudden withdrawal of shield 92 is that the energized potential may be turned off, the shield withdrawn, and the potential reapplied. This results in the same sudden bombardment of the substrate as does the sudden withdrawal of shield 92 with potential constantly applied to cathode 12.

With the withdrawal of shield 92, substrate 20 and anode 22 are subjected to high-energy particle bombardment. This suddenly increases the heat input from the sputtering environment to substrate 20 and anode 22. Temperature sensor 110 and temperature control unit 500 react immediately to this increase of heat input by withdrawing heat from anode 22 in the manner described above. As the sputtering continues, the heat input from the sputtering environment to substrate 20 continues, and temperature control unit 500, heater 142 and the coolant continue to withdraw heat from anode 22 and substrate 20 so as to maintain an equilibrium at the desired sputtering temperature. Assuming a desired sputtering temperature of 300° C., as measured by a thermocouple imbedded in substrate 20, the subject apparatus has been shown to maintain the temperature of the substrate within plus or minus one degree centigrade, even during the period when sputtering is first commenced.

While the invention has been particularly shown and described with reference to a preferred embodiment thereof, it will be understood by those skilled in the art that various changes in form and details may be made therein without departing from the spirit and scope of the invention.

What is claimed is:

1. In a sputtering device for depositing thin films of highly uniform characteristics, said sputtering device including a vacuum chamber, a cathode electrode having a discharge surface to be impact evaporated, a substrate, an anode electrode, said electrodes being arranged within said chamber, means to evacuate said chamber and impose within said chamber a suitable pressure of ionizable gas, and means to establish a suitable anode-cathode potential difference to thereby invoke an abnormal glow discharge whereby said discharge surface is impact evaporated and deposited on said substrate, an apparatus for controlling the temperature of the film during deposition thereof, comprising:

substrate mounting means for mounting said substrate within said chamber, and thermally interconnected with said substrate;

a temperature sensing element for sensing the temperature of said substrate and providing an electrical characteristic which is dependent upon said temperature;

means for heating said substrate mounting means;

means for convection cooling the interior of said substrate mounting means; and means connected to the output of said temperature sensing means for operating, each for a selected time period, said heating means and said cooling means in response to said characteristic of said temperature sensing means, whereby said film is maintained precisely uniform at a prescribed temperature.

2. The combination of claim 1 wherein:

said substrate mounting means forms a hollow cap, and said temperature sensing element and said means for heating and cooling are contained within said cap.

3. The combination of claim 2 wherein:

said cap includes separated cavities, a first cavity adjacent the surface of said cap in contact with said substrate and a second cavity separated from said cap surface by said first cavity, and said temperature sensing element and said cooling means are effective in said first cavity and said heating means is effective in said second cavity.

4. The combination of claim 3 wherein:

said heating means comprises a resistive heating coil, said cooling means comprises a fluid flow, and a hermetic and electrical sealing barrier isolating said first and second cavities.

5. The combination of claim 4 wherein said first cavity comprises a plurality of interconnecting channels.

References Cited

UNITED STATES PATENTS

| | | | |
|---|---|---|---|
| 3,294,661 | 12/1966 | Maissel | 204—192 |
| 2,551,697 | 5/1951 | Palmatier | 165—36 |
| 2,886,502 | 5/1959 | Holland | 204—192 |
| 3,051,813 | 8/1962 | Busch et al. | 219—20 |
| 3,121,852 | 2/1964 | Boyd et al. | 338—19 |
| 3,137,587 | 6/1964 | Wieder | 117—4 |
| 3,161,542 | 12/1964 | Ames et al. | 118—5 |
| 3,166,120 | 1/1965 | Butterfield et al. | 165—26 |
| 3,223,150 | 12/1965 | Tramontini | 165—34 |
| 3,244,497 | 4/1966 | Copeland | 65—162 |

OTHER REFERENCES

Justi: "Kaltetchnik," vol. 5, No. 6, 1953, pages 150–157.

HOWARD S. WILLIAMS, *Primary Examiner.*

ROBERT K. MIHALEK, *Examiner.*